(12) United States Patent
Hou (10) Patent No.: US 7,857,516 B2
(45) Date of Patent: Dec. 28, 2010

(54) HYDRODYNAMIC BEARING WITH BEARING SURFACE HAVING BRANCHED GROOVES

(75) Inventor: Chuen-Shu Hou, Taipei Hsien (TW)

(73) Assignee: Foxconn Technology Co., Ltd., Tucheng, Taipei County (TW)

( * ) Notice: Subject to any disclaimer, the term of this patent is extended or adjusted under 35 U.S.C. 154(b) by 956 days.

(21) Appl. No.: 11/687,197

(22) Filed: Mar. 16, 2007

(65) Prior Publication Data

US 2008/0155829 A1    Jul. 3, 2008

(30) Foreign Application Priority Data

Dec. 29, 2006    (CN) .................. 2006 1 0064610

(51) Int. Cl.
*F16C 32/06* (2006.01)
(52) U.S. Cl. ....................... 384/100; 384/114
(58) Field of Classification Search ................. 384/100, 384/114, 123, 292
See application file for complete search history.

(56) References Cited

U.S. PATENT DOCUMENTS 6,350,059 B1 *   2/2002   Takahashi ................... 384/123
2006/0192451 A1*   8/2006   Hong et al. ................... 310/90

FOREIGN PATENT DOCUMENTS

| CN | 1690459 A | 11/2005 |
|---|---|---|
| CN | 1824961 A | 8/2006 |
| JP | 10-306827 A | 11/1998 |
| WO | 2006/123602 A1 | 11/2006 |

\* cited by examiner

*Primary Examiner*—Thomas R Hannon
(74) *Attorney, Agent, or Firm*—Jeffrey T. Knapp (57) ABSTRACT

A hydrodynamic bearing (300) has a bearing surface adapted for receiving a shaft to rotate thereon. The bearing surface has a plurality of grooves (34) defined therein. The grooves are used for generating hydrodynamic pressure. A depth of each of the grooves is changed in a sloping trend along the extension direction of the groove.

6 Claims, 10 Drawing Sheets

HYDRODYNAMIC BEARING WITH BEARING SURFACE HAVING BRANCHED GROOVES

CROSS-REFERENCES TO RELATED APPLICATION

This application is related to U.S. patent application Ser. No. 11/627,566 filed on Jan. 26, 2007 and entitled "METHOD FOR MANUFACTURING HYDRODYNAMIC BEARING AND SHAFT"; the co-pending U.S. patent application is assigned to the same assignee as the instant application. The disclosure of the above-identified application is incorporated herein by reference.

BACKGROUND OF THE INVENTION

1. Field of the Invention

The present invention relates generally to a bearing and a shaft, and more particularly to a bearing with hydrodynamic pressure generating grooves.

2. Description of Related Art

At present, hydrodynamic bearings are widely used in spindle motors in devices, such as compact disc (CD) drivers, digital video disc (DVD) drivers, hard disk drivers, laser beam printers, floppy disk drivers or in heat-dissipation fans. Spindle motors require a hydrodynamic bearing of small size, high rotational accuracy and long life.

Figure 10:
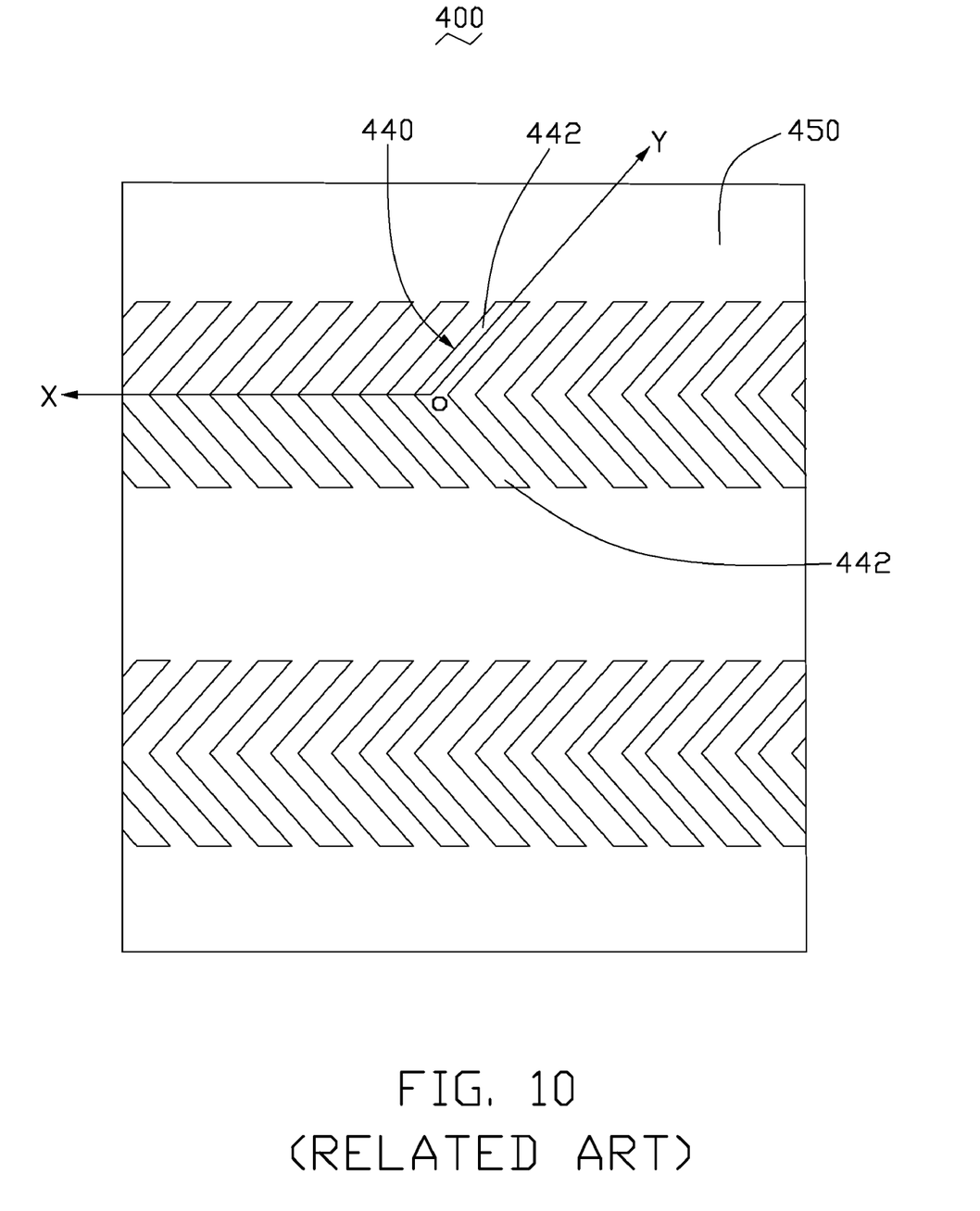
FIG. 10 is an expanded view of a related hydrodynamic bearing.

A typical hydrodynamic bearing defines a bearing hole therein. A shaft is rotatably received in the bearing hole. A plurality of herringbone-shaped (i.e., branching off from a central axis) grooves are defined either in an inner circumferential surface of the bearing or in an external circumferential surface of the shaft. The grooves can accommodate lubricant, such as oil. During rotation of the shaft, the lubricant is driven by the rotating shaft. A lubricating film is thus formed in a clearance between the external circumferential surface of the shaft and the inner circumferential surface of the bearing. Accordingly, the shaft is supported by hydrodynamic shearing stress and dynamic pressure generated by the lubricating film when the lubricant flows through different cross-sections. Referring to FIG. 10, a hydrodynamic bearing 400 has a plurality of herringbone-shaped grooves 440 defined in an inner circumferential surface thereof. Each of the grooves 440 includes two branches 442. The supporting pressure is mainly determined by the dynamic pressure generated around a crossing point of the two branches 442. However, the dynamic pressure is steady and hard to be regulated due to uniform depth of each of the branches 442 along a direction of lubricant flow (shown as direction OY). Accordingly, the hydrodynamic bearing 400 having uniform depth cannot be used to carry differing loads.

A related method for manufacturing the hydrodynamic bearing 400 comprises following processes of: (a1) manufacturing a bearing preform with a bearing hole therein; and (a2) defining a plurality of hydrodynamic pressure generating grooves 440 in a bearing surface 450 of the bearing preform by chemical etching, electrolysis electric discharge or machining. However, the small size of the hydrodynamic bearing 400 results in difficulties in particularly in the making of the grooves 440 in the bearing surface 450 of the bearing preform. This makes manufacturing of the hydrodynamic bearing 400 both time-consuming and expensive. Therefore, the related method is not suitable for mass-production of the hydrodynamic bearing 400.

It is therefore desirable to provide an improved method for mass production of a hydrodynamic bearing which can be used to carry differing loads.

SUMMARY OF THE INVENTION

A hydrodynamic bearing has a bearing surface adapted for receiving a shaft to rotate thereon. The bearing surface has a plurality of grooves defined therein. The grooves are used for generating hydrodynamic pressure. Each groove has a sloping (i.e., rounded) gradient along an extension direction of the groove.

Other advantages and novel features of the present invention will become more apparent from the following detailed description of preferred embodiment when taken in conjunction with the accompanying drawings, in which:

BRIEF DESCRIPTION OF THE DRAWINGS

Many aspects of the present driving device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
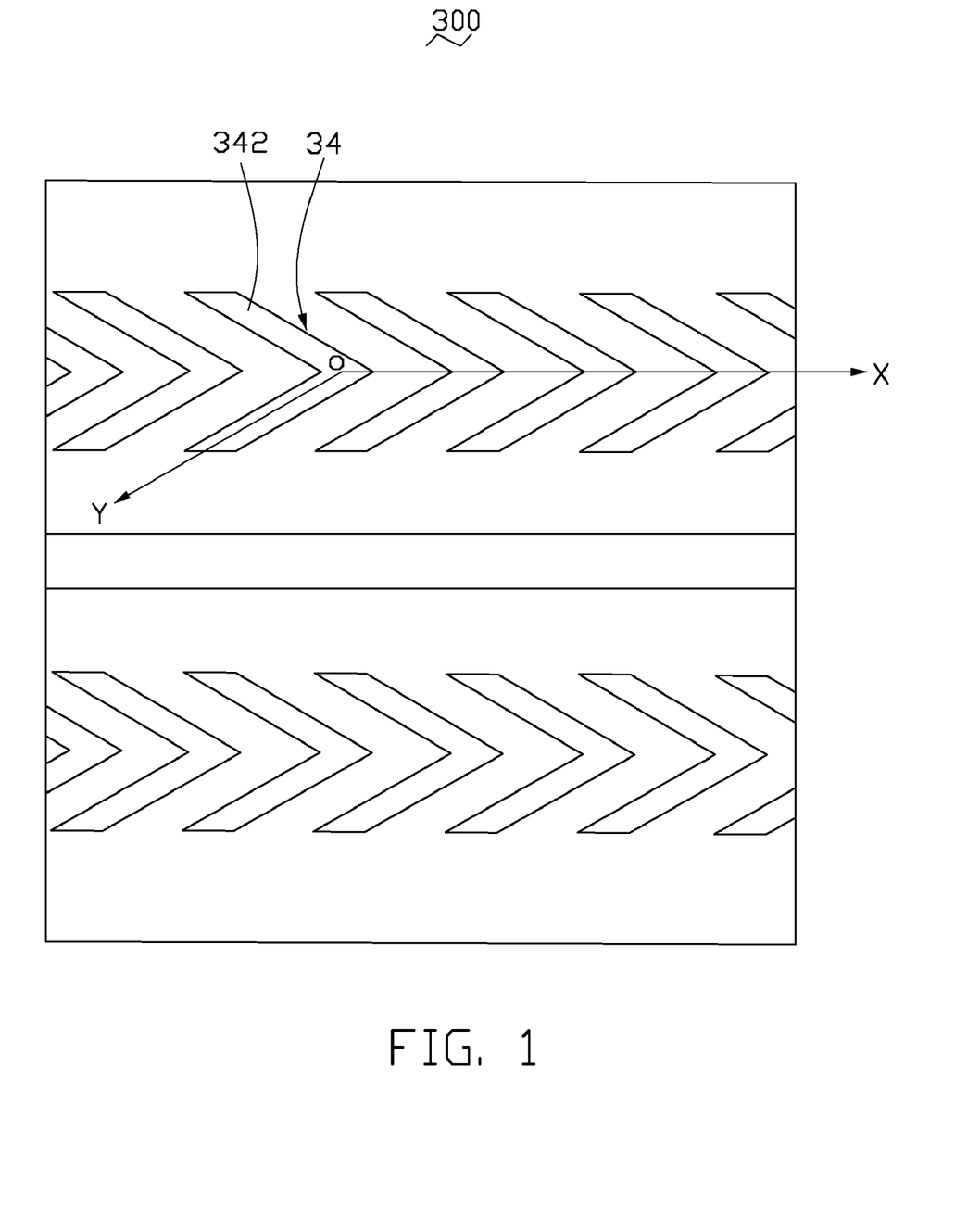
FIG. 1 is an expanded view along a circumferential direction of a hydrodynamic bearing in accordance with a preferred embodiment of the present invention.

Referring to FIG. 1, a hydrodynamic bearing 300 in accordance with a preferred embodiment of the present invention is shown. The hydrodynamic bearing 300 has a plurality of herringbone-shaped grooves 34 with reduced lubricant leakage that can provide a large hydrodynamic pressure to support a shaft (not shown) that is adapted to be engaged in the hydrodynamic bearing 300. The herringbone-shaped grooves 34 are spaced from each other and arranged in a circumferential direction of the hydrodynamic bearing 300. Each of the grooves 34 can be V shaped, and includes two branches 342. An extension direction of each of the two branches 342 (shown as direction YO) deviates from a circumferential direction of the hydrodynamic bearing 300 (shown as direction OX). A depth of the branch 342 along a direction of lubricant flowing (shown as direction OY) varies in a sloping trend.

Figure 2:
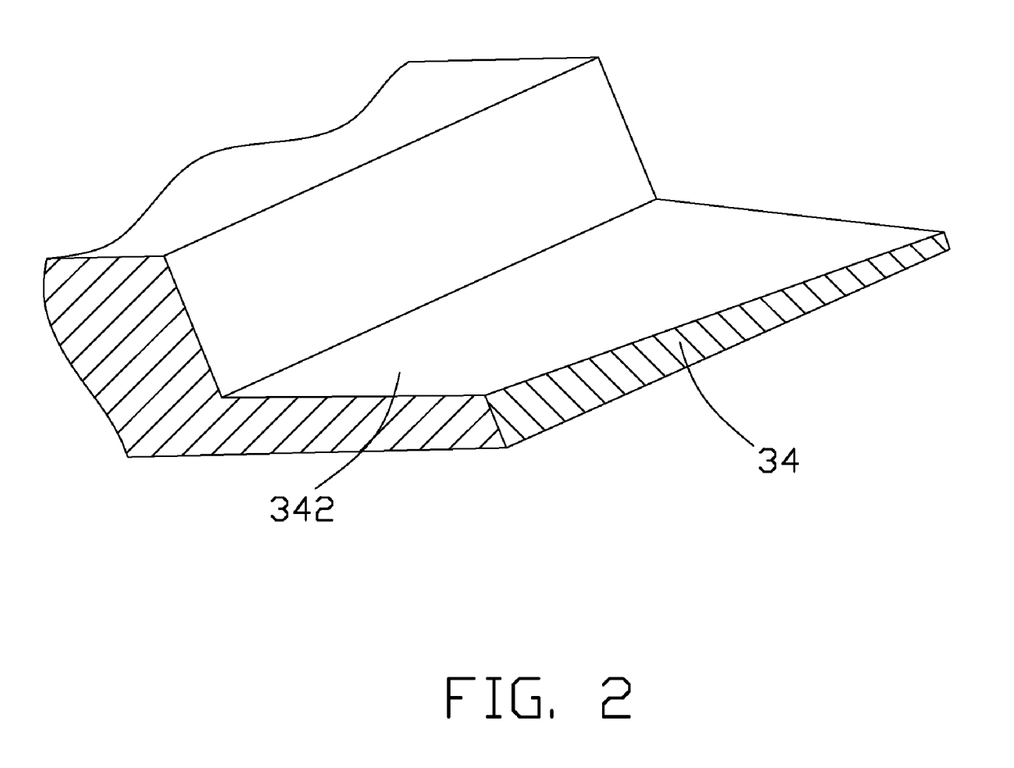
FIG. 2 is a partial isometric view of a herringbone-shaped groove in the hydrodynamic bearing along direction YO of FIG. 1.

Referring to FIG. 2, a depth of each branch 342 increases in a gradient trend along the direction YO from an end of the branch 342 to a crossing point of the two branches 342. When the shaft rotates, the lubricant having a constant volume flows from the end to the crossing point of the branches 342. Accordingly, the hydrodynamic pressure caused by the lubricant between the hydrodynamic bearing 300 and the shaft decreases as the depth of each of the branches 342 becomes deeper. In this way, the hydrodynamic bearing 300 having the branches 342 can be adapted to carry a light load.

Figure 3:
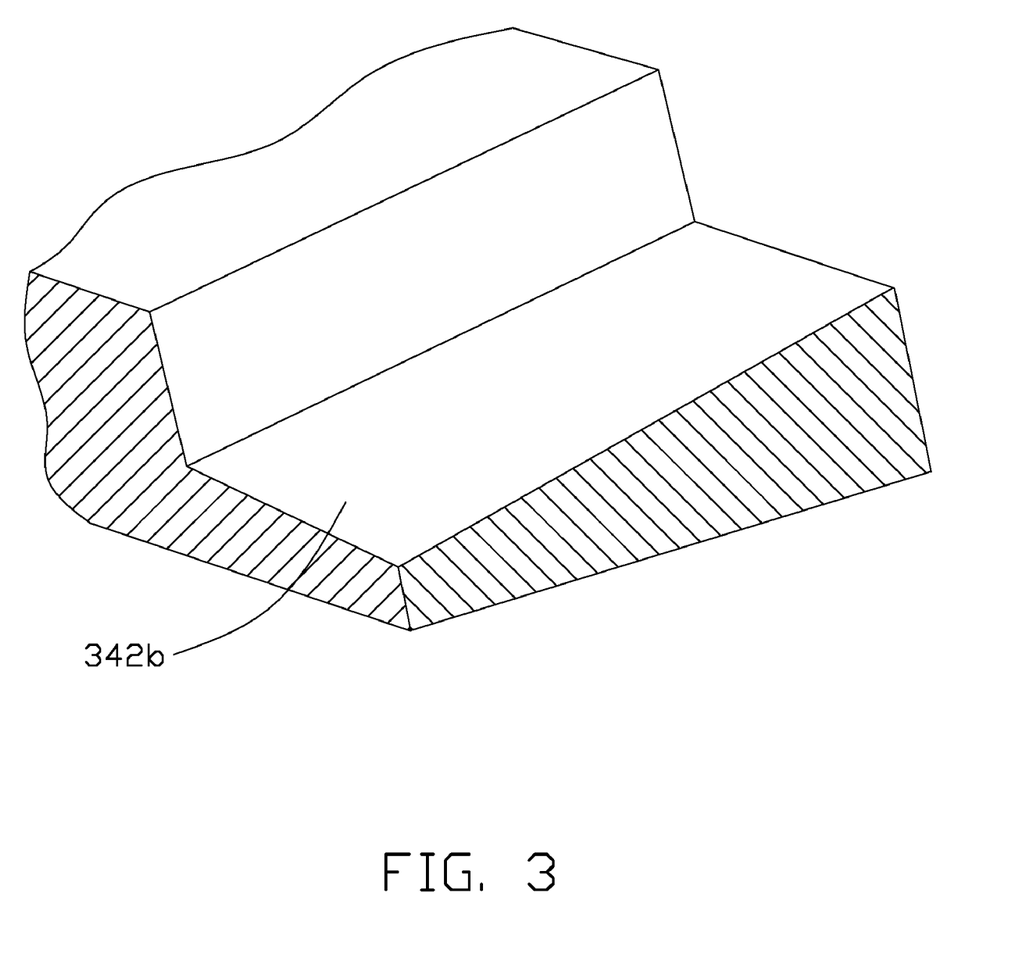
FIG. 3 is a partial isometric view of a herringbone-shaped groove in accordance with a second embodiment of the present invention.

Furthermore, the two branches 342 can be shaped as two branches 342b shown as FIG. 3 in accordance with a second embodiment of the present invention. A depth of each branch 342b decreases in a gradient trend along the direction YO from an end of the branch 342b to a crossing point of the two branches 342b. When the shaft rotates, the lubricant having a constant volume flows from the end to the crossing point of the two branches 342b. Accordingly, the hydrodynamic pressure increases as the depth of each of the branches 342b becomes shallower. In this way, a hydrodynamic bearing (not shown) having the branches 342b can be adapted to carry a heavy load.

Figure 4:
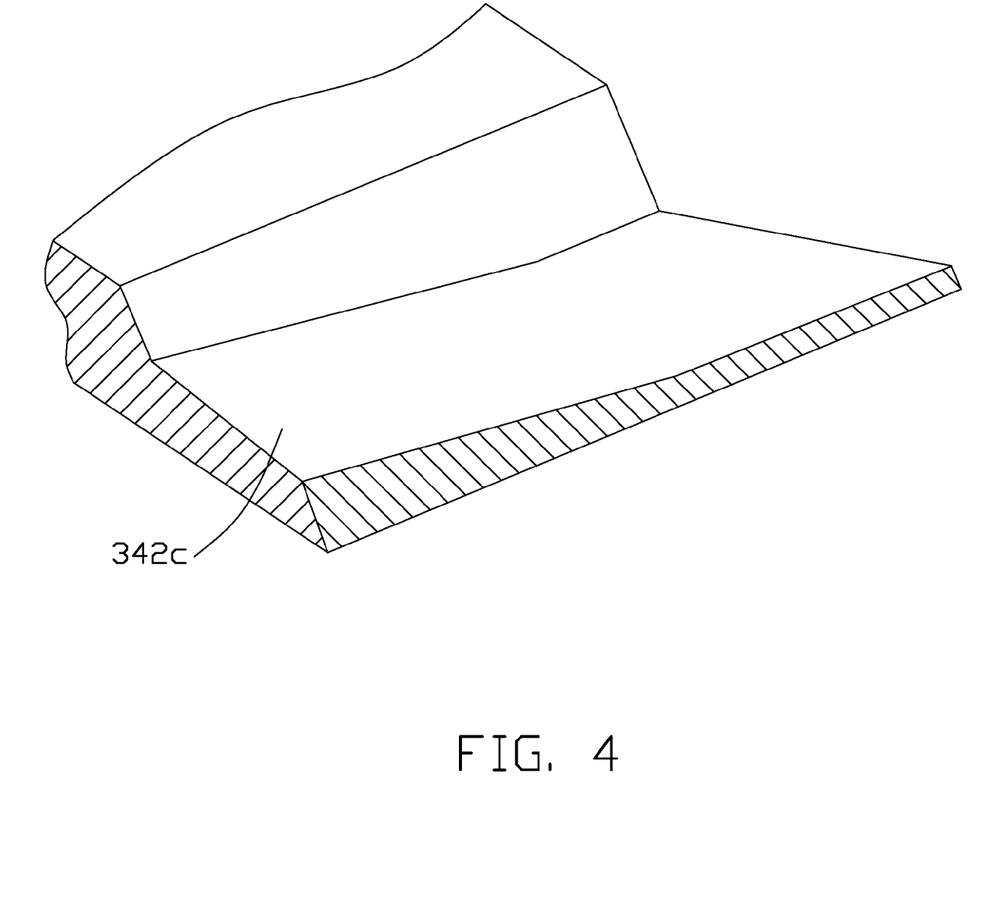
FIG. 4 is a partial isometric view of a herringbone-shaped groove in accordance with a third embodiment of the present invention.
Figure 5:
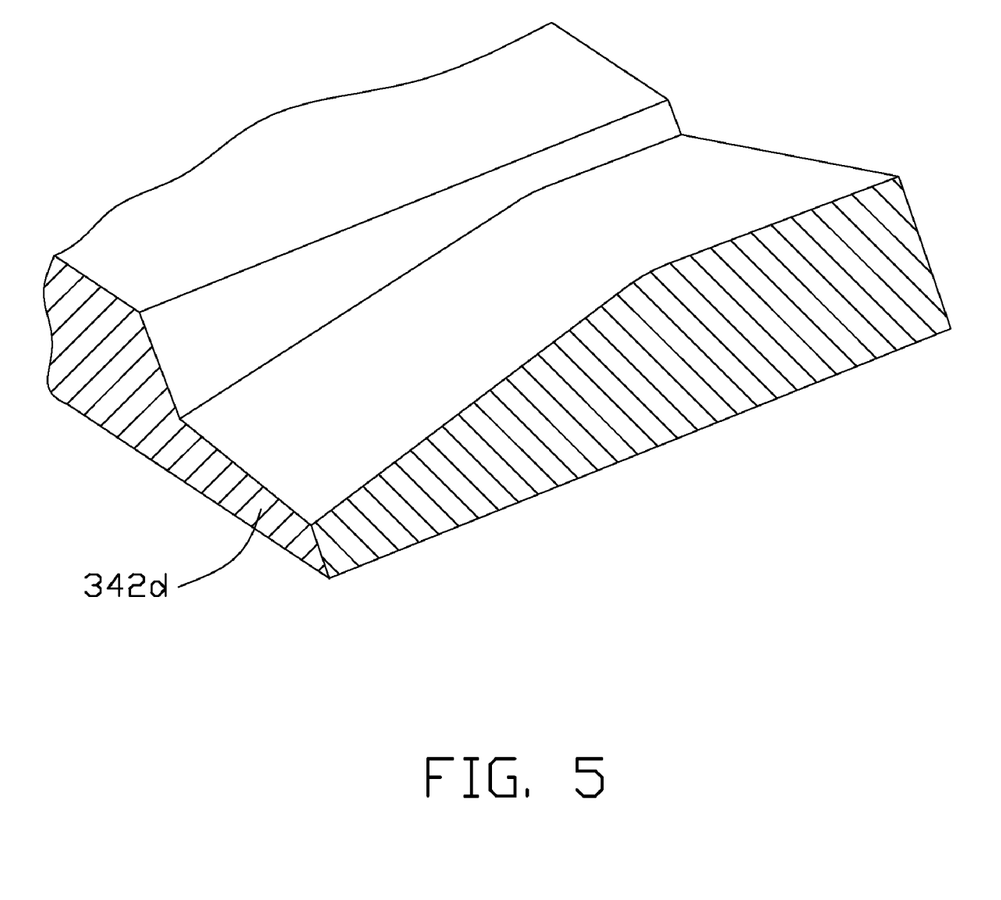
FIG. 5 is a partial isometric view of a herringbone-shaped groove in accordance with a fourth embodiment of the present invention.

Moreover, the two branches 342 can be shaped as two branches 342c, 342d shown as FIG. 4 and FIG. 5 respectively in accordance with a third embodiment and a fourth embodiment of the present invention. A depth of each of the branches 342c firstly increases in a gradient trend along the direction YO, then remains uniform from a predetermined part of each of the branches 342c to a crossing point of the two branches 342c. Accordingly, the hydrodynamic pressure caused by the lubricant decreases, and then remains uniform. In this manner, the hydrodynamic bearing 300 having the branches 342c can be adapted to carry a light and steady load. A depth of each of the branches 342d firstly decreases in a sloping trend along the direction YO, then remains uniform from a predetermined part of each branch 342d to a crossing point of the two branches 342d, thus causing the hydrodynamic pressure caused by the lubricant to firstly increase, and then remain uniform. In this manner, the hydrodynamic bearing 300 having the branches 342d is adapted to carry a heavy and steady load.

As described above, a depth of each branch 342, 342b, 342c or 342d changes in a sloping trend along the extension direction (shown as the direction YO) so that the hydrodynamic bearing having herringbone-shaped grooves formed by the branches 342, 342b, 342c or 342d can be used to carry differing loads. The herringbone-shaped grooves configured by the branches 342, 342b, 342c or 342d can also been defined in the shaft.

Figure 6:
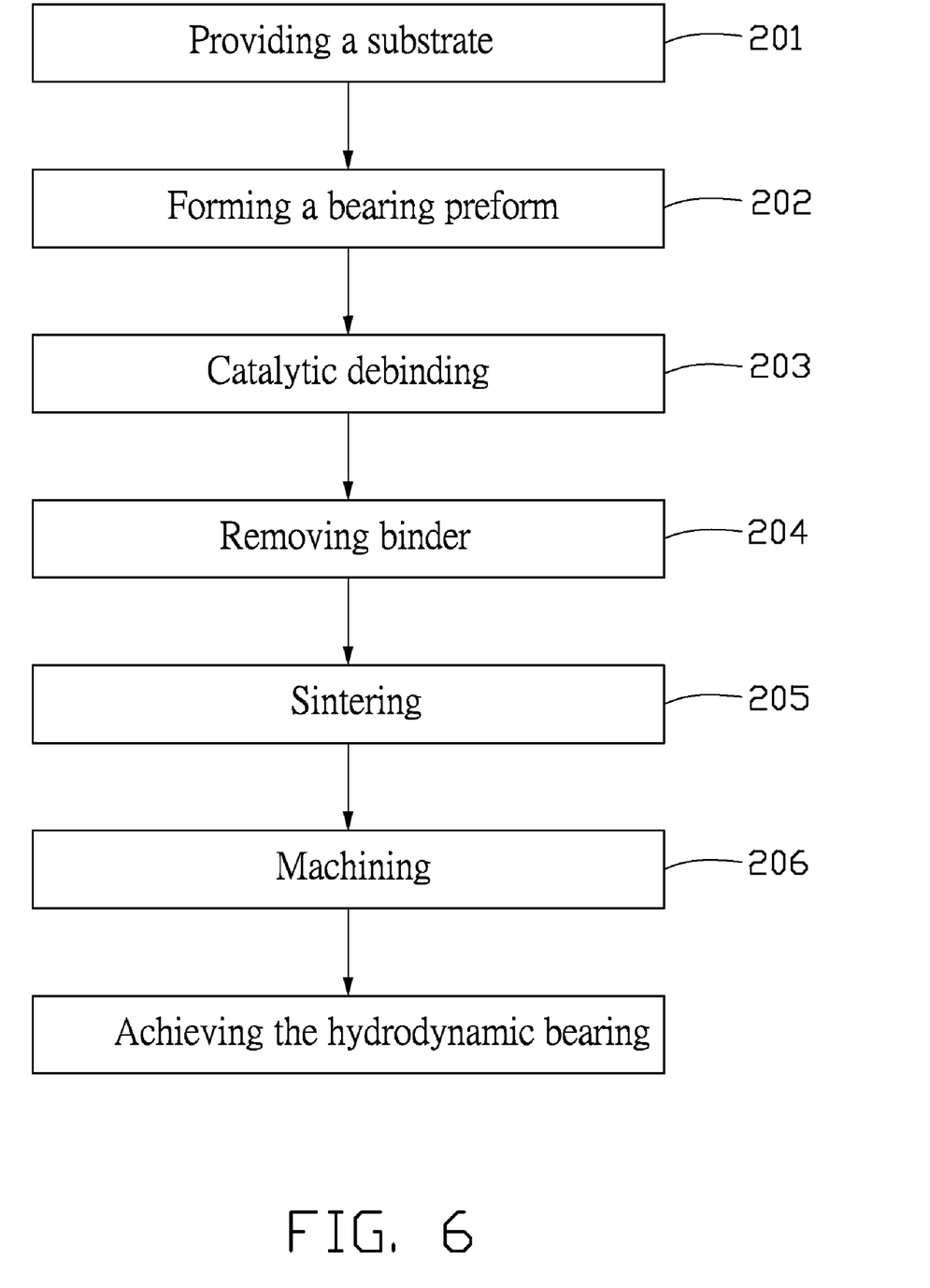
FIG. 6 is a flow chart of a method employed in manufacturing the hydrodynamic bearing of FIG. 1.
Figure 7:
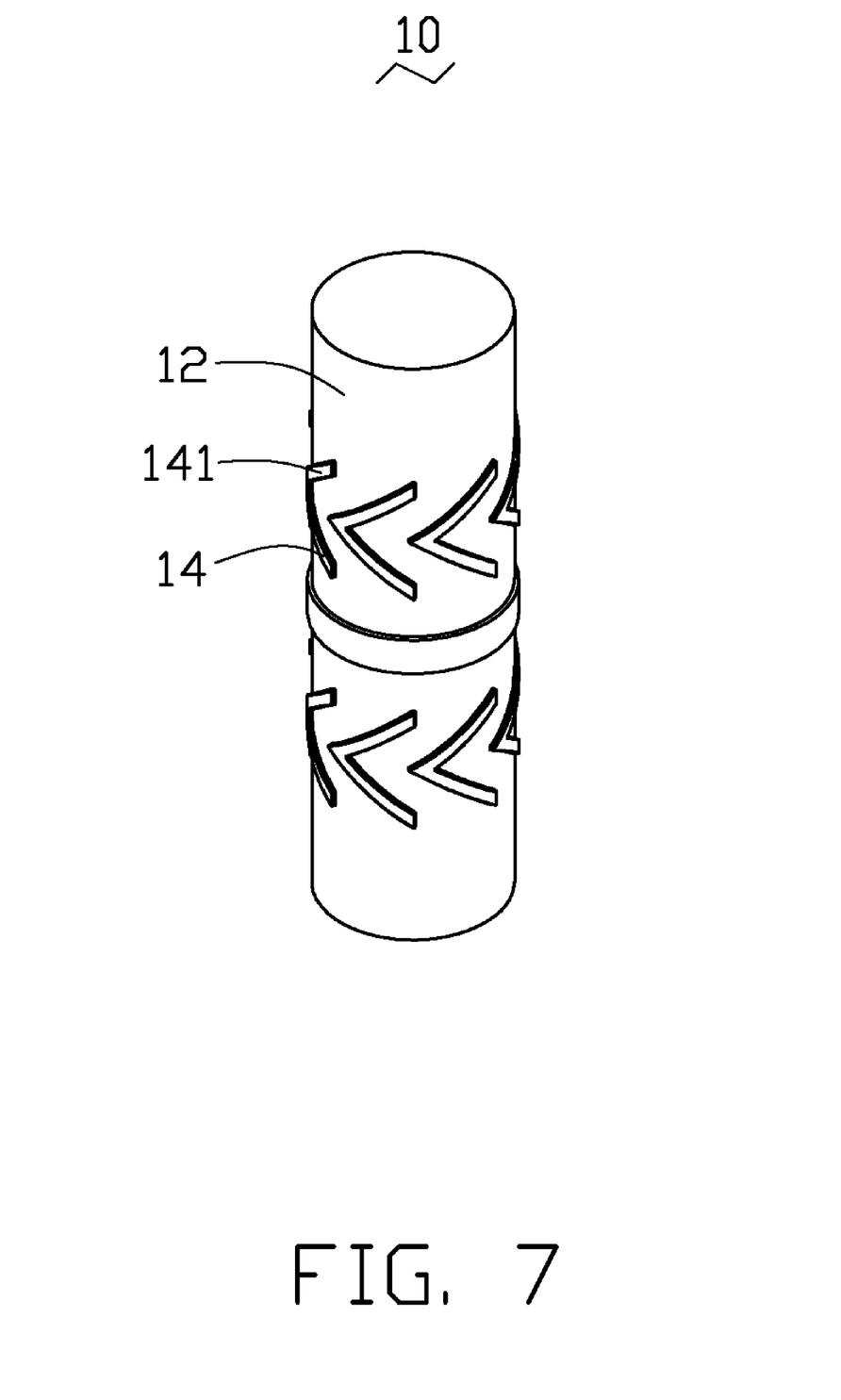
FIG. 7 is an isometric view of a substrate formed by the method in FIG. 6.
Figure 8:
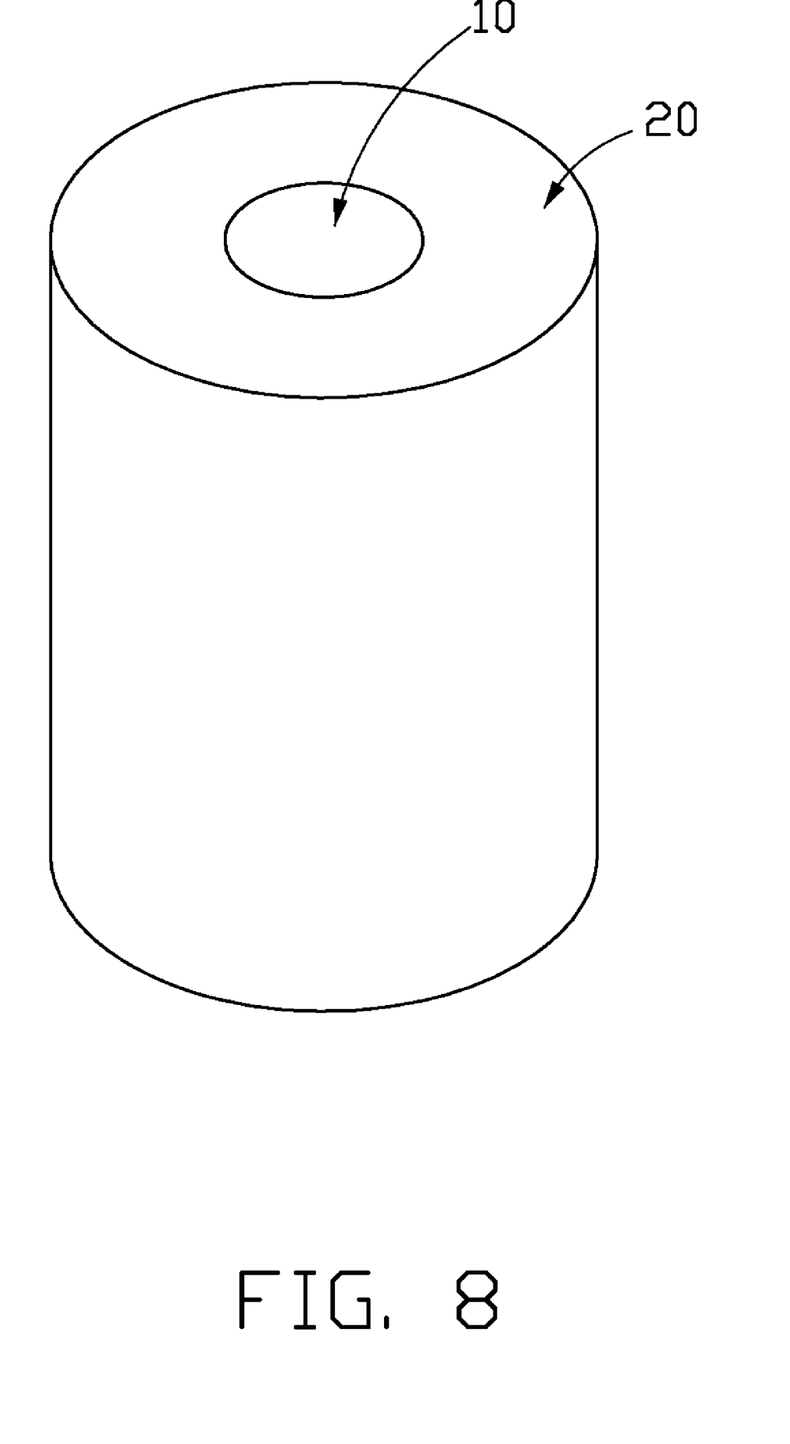
FIG. 8 is an isometric view of the substrate of FIG. 7 surrounded by a bearing preform.

As shown in FIG. 6 to FIG. 9, a method for manufacturing the hydrodynamic bearing 300 formed by the branches 342 can also used to manufacture a hydrodynamic bearing (not shown) formed by the branches 342b, 342c or 342d. For example, the method for manufacturing the hydrodynamic bearing 300 configured by the branch 342 in accordance with the present invention, comprises steps of:

step 201: providing a substrate 10 with a plurality of protrusions 14 formed on a periphery thereof;

step 202: placing the substrate 10 in a middle of a hollow mold, then injecting a feedstock of powder and molten binder into the mold to surround the substrate 10 under pressure, thus forming a desired bearing preform 20;

step 203: separating the substrate 10 from the bearing preform 20 by means of catalytic debinding;

step 204: separating the binder from the bearing preform 20;

step 205: sintering the bearing preform 20;

step 206: performing a precision machining to the bearing preform 20, thereby forming the desired hydrodynamic bearing 300.

The substrate 10 should be configured according to the grooves 34 of the hydrodynamic bearing 300 as an external periphery of the substrate 10 corresponding to an inner surface of the desired hydrodynamic bearing 300. The substrate 10 comprises a cylindrical body 12 and a plurality of herringbone-shaped protrusions 14 formed on a circumferential surface of the body 12. The body 12 is used for forming a bearing hole of the hydrodynamic bearing 300 and the protrusions 14 are used to form the herringbone-shaped grooves 34 of the hydrodynamic bearing 300. Each of the protrusions 14 includes two branches 141. Corresponding to the depth of the branches 342, 342b, 342c or 342d, a thickness of each branch 141 varies in a sloping trend along an extension direction of the branch 141.

Step 201 is described in detail as follows: a material for forming the substrate 10 should meet requirements for steps 202 and 203. In step 202, a melting point of the material for forming the substrate 10 is required to be higher than that of the molten binder of the feedstock to prevent the substrate 10 from being deformed when the substrate 10 contacts with the feedstock. On the other hand, in step 203, the material for forming the substrate 10 should be easily separable from the hydrodynamic bearing preform 20 by means of debinding. For example, polyoxymethylene (POM) can be used as a material for the substrate 10. POM has many advantages such as excellent mechanical properties (i.e. rigidity, impact resistant, low abrasion, creep resistance), outstanding chemical properties (i.e. hydrolytic stability fatigue endurance and solvent resistance) and good thermal stability. The substrate 10 composed of POM can be made by means of injection molding, extrusion molding, blow molding, rotational molding, soldering, adhering, coating, plating, machining and so on. Injection molding can be used for making the desired substrate 10 and has steps including: (c1) melting the material used for forming the substrate 10; (c2) injecting the molten material into a mold (not shown) to form the substrate 10; (c3) cooling the mold and taking the substrate 10 out of the mold. Injection molding can be performed in a normal injection machine. The material for forming the substrate 10 further comprises dispersant, surfactant and additive.

Step 202 is described in detail as follows: the hydrodynamic bearing preform 20 can be formed by metal injection molding (MIM) when the substrate 10 is mainly composed of POM. The feedstock generally comprises metal powder or ceramic powder. The binder of the feedstock is required to have a lower melting point than that of the substrate 10 and to be easily removable by debinding or extraction, such as polyethylene (PE). MIM includes the following processes: (d1) mixing the powder and the binder to form the feedstock under a high temperature; (d2) pushing the feedstock to form a desired shape such as the hydrodynamic bearing preform 20 in a mold under pressure. The injection machine used in step 201 for forming the substrate 10 can be used to manufacture the hydrodynamic bearing preform 20 in step 202. MIM used for manufacturing the hydrodynamic bearing preform 20 has many advantages such as high shape complexity, low cost, tight tolerances, high density, high performance etc.

Step 203 is described in detail as follows: the debinding methods available include thermal cracking debinding and catalytic debinding. Catalytic debinding is used to separate the substrate 10 from the hydrodynamic bearing preform 20 in accordance with a preferred embodiment of the present invention. Catalytic debinding comprises following processes: (e1) placing the hydrodynamic bearing preform 20 made by step 202 in a central area of a furnace for debinding; (e2) Inputting nitric acid ($HNO_3$) gas as a catalyst into the furnace at a temperature in an approximate range of between 110° C. and 140° C. that is lower than a melting point of the hydrodynamic bearing preform 20. POM reacts with $HNO_3$ and decomposes to gaseous formaldehyde in the acid and thermal atmosphere so that the substrate 10 can be quickly removed from the hydrodynamic bearing preform 20. Thus the rate of debinding is increased and the hydrodynamic bearing preform 20 is given good shape retention by means of catalytic debinding; however, during thermal cracking debinding process, the hydrodynamic bearing preform 20 is inclined to break during the thermal cracking debinding process because of the difference between a coefficient of expansion of the substrate 10 and that of the hydrodynamic bearing preform 20. Accordingly, the catalytic cracking debinding is preferred to thermal cracking debinding in the present invention. In spite of this, thermal cracking debinding still can be used to achieve the debinding of the substrate 10 if the heating process thereof is precisely controlled. Furthermore, the gaseous formaldehyde produced during the catalytic debinding process is transferred to another part of the furnace to burn into carbon dioxide ($CO_2$) and nitrogen dioxide ($NO_2$), which are not toxic. As a result, the bearing 300 has accurate size and concentricity.

Step 204 is described in detail as follows: after the substrate 10 is separated from the bearing preform 20, the binder can be removed from the bearing preform 20 by means of thermal debinding or extraction.

Step 205 is described in detail as follows: after the binder is separated from the bearing preform 20, the bearing preform 20 consequently becomes weak. Therefore, it is necessary to sinter the bearing preform 20 in place. The sintering process can be performed in a vacuum, or in an oxygen and/or nitrogen atmosphere.

Figure 9:
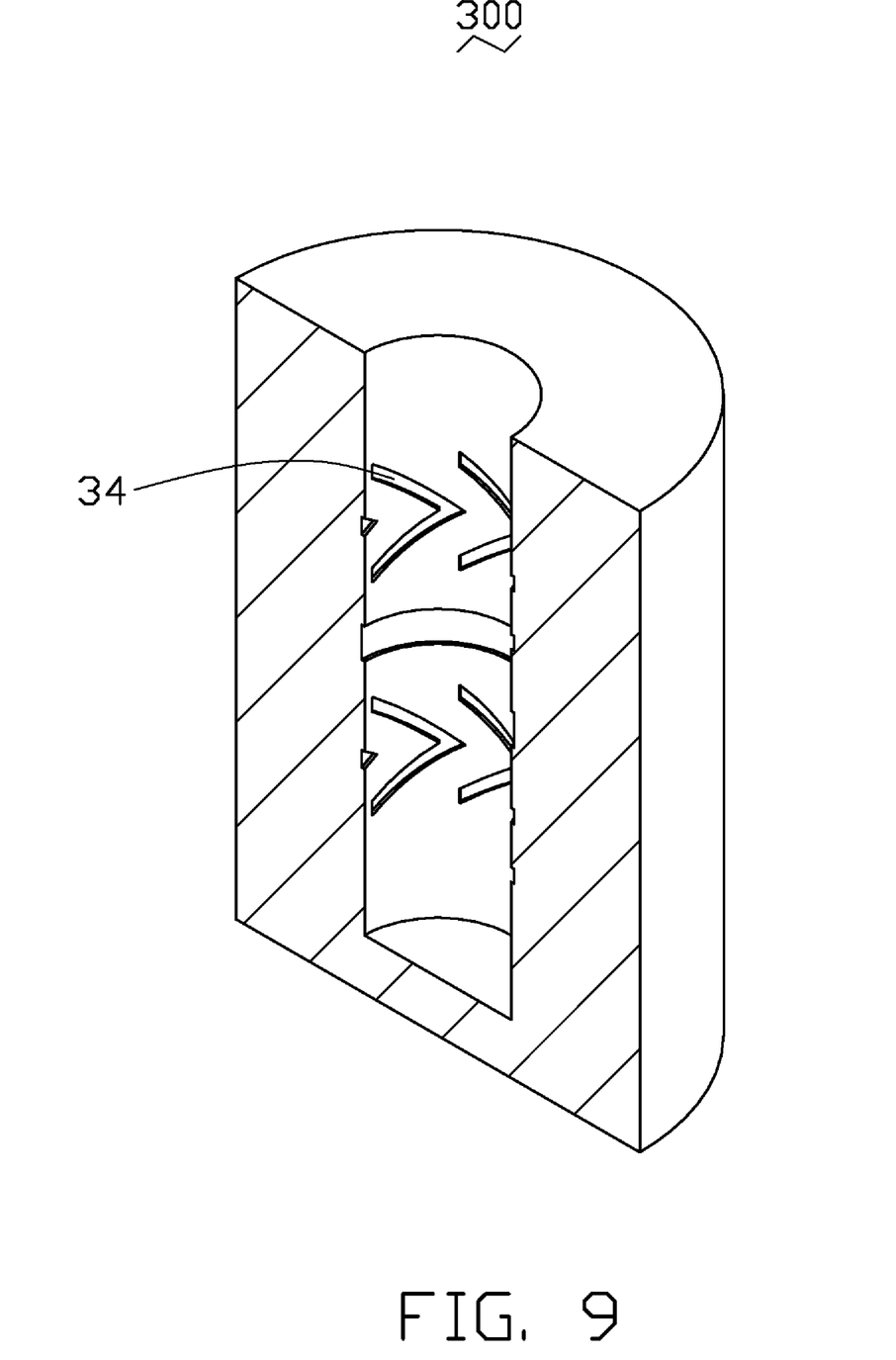
FIG. 9 is a cross-sectional, isometric view of the hydrodynamic bearing obtained by the method of FIG. 6.

Step 206 is described in detail as follows: generally, the hydrodynamic bearing preform 20 is inclined to deform during sintering processes. In order to make the hydrodynamic bearing preform 20 having a high level of precision in its manufacture, it is necessary to perform a machining operation on the bearing preform 20 using methods such as broaching, grinding, milling, polishing, and so on.

Furthermore, the method in accordance with the preferred embodiment of the present invention can be used for manufacturing other kinds of hydrodynamic bearings or shafts with different shapes of grooves. When applying the method to make a desired shaft with hydrodynamic pressure generating grooves formed in a circumferential surface thereof, a substrate with a central hole defined therein should be provided. An internal surface of the substrate is required to correspond in shape to the circumferential surface of the desired shaft.

Compared with the related method for manufacturing the related hydrodynamic bearing 400, the hydrodynamic bearing 300 is configured (i.e., structured and arranged) for mass-production by the method in accordance with the preferred embodiment of the present invention. Also, the hydrodynamic bearing 300 manufactured by the present method can be used to afford different loads.

It is to be understood that the above-described methods are intended to illustrate rather than limit the invention. Variations may be made to the methods without departing from the spirit of the invention. Accordingly, it is appropriate that the appended claims be construed broadly and in a manner consistent with the scope of the invention.

What is claimed is:

1. A hydrodynamic bearing having a bearing surface adapted for receiving a shaft to rotate thereon, the bearing surface having a plurality of grooves defined therein, the grooves being for generating hydrodynamic pressure, each of the grooves of the hydrodynamic bearing being herringbone shaped and comprising two branches, an extension direction of each of the two branches deviating from a circumferential direction of the hydrodynamic bearing;

wherein a depth of each of the branches firstly varies in a gradient trend along the extension direction, and then remains uniform from a predetermined part of each of the branches to a crossing point of the two branches.

2. The hydrodynamic bearing as claimed in claim 1, wherein the depth of each of the branches firstly increases in a gradient trend along the extension direction, and then remains uniform from the predetermined part of each of the branches to the crossing point of the two branches.

3. The hydrodynamic bearing as claimed in claim 1, wherein a depth of each of the branches firstly decreases in a sloping trend along the extension direction, and then remains uniform from a predetermined part of each of the branches to a crossing point of the two branches.

4. A bearing surface adapted for receiving an element to rotate thereon, comprising:
a plurality of grooves therein, each of the grooves having at least two branches connecting with each other at a connecting point, each of the branches having a groove depth which is varied along an extension direction of each of the branches from an end of each of the branches to the connecting point;
wherein the groove depth firstly is varied in a gradient trend along the extension direction, and then remains uniform from a predetermined part of each of the branches to the connecting point of the two branches.

5. The bearing surface as claimed in claim 4, wherein the groove depth of each of the branches firstly increases in a gradient trend along the extension direction, and then remains uniform from the predetermined part of each of the branches to the connecting point of the two branches.

6. The bearing surface as claimed in claim 4, wherein the groove depth of each of the branches firstly decreases in a gradient trend along the extension direction, and then remains uniform from the predetermined part of each of the branches to the connecting point of the two branches.

* * * * *